US012795589B2

(12) United States Patent
Ahn et al.

(10) Patent No.: US 12,795,589 B2
(45) Date of Patent: Nov. 10, 2026

(54) METHOD FOR PROVIDING FUNCTION BASED ON MOVEMENT OF USER TERMINAL, AND ELECTRONIC DEVICE SUPPORTING THE SAME

(71) Applicant: KAKAO CORP., Jeju-si (KR)

(72) Inventors: Seon Young Ahn, Seongnam-si (KR); Hye Jung Roh, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 268 days.

(21) Appl. No.: 18/643,297

(22) Filed: Apr. 23, 2024

(65) Prior Publication Data

US 2024/0389055 A1 Nov. 21, 2024

(30) Foreign Application Priority Data

May 18, 2023 (KR) ........................ 10-2023-0064580

(51) Int. Cl.
*H04W 64/00* (2009.01)
*H04W 4/20* (2018.01)
*H04W 4/24* (2024.01)

(52) U.S. Cl.
CPC ............. *H04W 64/00* (2013.01); *H04W 4/20* (2013.01); *H04W 4/24* (2013.01)

(58) Field of Classification Search
CPC .......... H04W 64/00; H04W 4/20; H04W 4/24
See application file for complete search history.

(56) References Cited

U.S. PATENT DOCUMENTS 11,246,008 B2 * 2/2022 Shionozaki ............ G06Q 10/40
2013/0232197 A1 * 9/2013 Shin ...................... H04W 4/021 709/204
2014/0295892 A1 * 10/2014 Pae ....................... H04W 4/023 455/456.3
2015/0161643 A1 * 6/2015 Randell ............. G06Q 30/0235 705/14.26

(Continued)

FOREIGN PATENT DOCUMENTS

KR 10-2016-0001228 A 1/2016
KR 10-2014-0037495 A 3/2017

(Continued)

OTHER PUBLICATIONS

Office Action dated Feb. 5, 2025 in Korean Patent Application No. 10-2023-0064580 in 14 pages.

(Continued)

*Primary Examiner* — Mohamed Barakat
(74) *Attorney, Agent, or Firm* — Knobbe, Martens, Olson & Bear, LLP

(57) ABSTRACT

Proposed is a method for providing a function based on a movement of a user terminal. The method may include detecting a movement of the user terminal, and in response to the detected movement being a preset movement, confirming current location information of the user terminal. The method may also include identifying at least one function to be shown on a screen of the user terminal, wherein the at least one function is determined based on whether the current location information is associated with user information of the user terminal. The method may further include displaying a user interface corresponding to one of the at least one identified function on the screen of the user terminal.

17 Claims, 11 Drawing Sheets

(56) References Cited

U.S. PATENT DOCUMENTS

| | | | | |
|---|---|---|---|---|
| 2016/0054428 A1* | 2/2016 | Eldic | H04W 64/00 455/574 |
| 2016/0259420 A1* | 9/2016 | Kim | G06F 3/017 |
| 2024/0195925 A1* | 6/2024 | Suzuki | H04N 1/00639 |

FOREIGN PATENT DOCUMENTS

| | | | |
|---|---|---|---|
| KR | 10-1879857 | B1 | 7/2018 |
| KR | 10-2019-0065755 | A | 6/2019 |
| KR | 10-2020-0039625 | A | 4/2020 |
| KR | 10-2020-0128490 | A | 11/2020 |

OTHER PUBLICATIONS

Final Office Action received in Korean Patent Application No. 10-2023-0064580 dated May 1, 2025.

* cited by examiner

METHOD FOR PROVIDING FUNCTION BASED ON MOVEMENT OF USER TERMINAL, AND ELECTRONIC DEVICE SUPPORTING THE SAME

CROSS-REFERENCE TO RELATED APPLICATION

This application claims priority to and the benefit of Korean Patent Application No. 10-2023-0064580 filed on May 18, 2023, the disclosure of which is incorporated herein by reference in its entirety.

BACKGROUND

Technical Field

The present disclosure relates to a method for providing a customized function based on location information and user information of a user terminal when a shaking movement of the user terminal is detected, and an electronic device supporting the same.

Description of Related Technology

With the widespread adoption of smartphones and the advancement of mobile communication networks, smartphone users now have access to a wide range of information and services.

Recently, smartphone location-based services, such as subway arrival time notifications and navigation, have become increasingly common, offering users information for various purposes. In other words, location information is obtained through the smartphone's GPS (Global Positioning System) signal, enabling the delivery of diverse information and services tailored to the user's confirmed location.

SUMMARY

The present disclosure provides a method and system for providing a user with customized functions and services based on location information and user information of the user terminal in response to a shaking movement of the user terminal.

In one general aspect, there is provided a method for providing a function based on a movement of a user terminal, the method including: detecting a movement of the user terminal; in response to the detected movement being a preset movement, confirming current location information of the user terminal; identifying at least one function to be shown on a screen of the user terminal, wherein the at least one function is determined based on whether the current location information is associated with user information of the user terminal; and displaying a user interface corresponding to one of the at least one identified function on the screen of the user terminal.

The identifying of at least one function to be shown on the screen of the user terminal may include determining, by the user terminal, whether the current location information confirmed by the user terminal is associated with user information stored in the user terminal.

The identifying of at least one function to be shown on the screen of the user terminal may include: receiving data on the at least one function from a service server, wherein the service server determines whether the current location information is associated with user information of the user terminal; and based on the received data, identifying at least one function to be shown on the screen of the user terminal.

The identifying of at least one function to be shown on the screen of the user terminal may include: identifying functions to be activated in response to the preset movement; and determining at least one function to be shown on the screen of the user terminal among the identified functions.

The displaying of a user interface corresponding to one of the at least one identified function on the screen of the user terminal may include: in response to the at least one identified function being in plural, displaying a list of user interfaces corresponding to the respective functions on the screen of the user terminal; detecting a user interaction for any one of the listed user interfaces; and displaying, on the screen of the user terminal, the user interface for which the user interaction is detected.

The displaying of the list of user interfaces may include determining where to display the list of user interfaces on the screen, based on recent history information of the user terminal that has activated the respective functions.

The at least one function may be determined based on whether information of a place located within a preset distance from the current location information of the user terminal is associated with the user information of the user terminal.

The method may further include: detecting a user interaction for changing a range of the preset distance; identifying at least one updated function based on the changed range; and displaying a user interface corresponding to any one of the updated at least one function on the screen of the user terminal.

The user information of the user terminal may be at least one of the following: place reservation information of the user terminal, identity authentication information of the user terminal, coupon information, schedule information of the user terminal, membership information of the user terminal, and payment method information of the user terminal.

In another aspect, there is provided a user terminal for providing a function based on a movement thereof, the user terminal including a memory storing instructions and a processor configured to execute the instructions to: detect a movement of the user terminal; in response to the detected movement being a preset movement, confirm current location information of the user terminal; identify at least one function to be shown on a screen of the user terminal, wherein the at least one function is determined based on whether the current location information is associated with user information of the user terminal; and display a user interface corresponding to one of the at least one identified function on the screen of the user terminal.

In yet another aspect, there is provided a method for providing a function based on a movement of a user terminal by a server, the method including: receiving current location information of the user terminal from the user terminal; determining whether the current location information is associated with user information of the user terminal; generating at least one function based on a result of the determination; and transmitting the at least one function to the user terminal, The determining of whether the current location information is associated with the user information of the user terminal may be based on whether the user information of the user terminal is associated with information of a place located within a preset distance from the current location information of the user terminal.

The method may further include: receiving a signal to change a range of the preset distance from the user terminal;

determining whether information of a place located within the changed range is associated with the user information of the user terminal; generating at least one updated function based on a result of the determination; and transmitting the at least one updated function to the user terminal.

The user information of the user terminal may be at least one of the following: place reservation information of the user terminal, identity authentication information of the user terminal, coupon information, schedule information of the user terminal, membership information of the user terminal, and payment method information of the user terminal.

The schedule information of the user terminal may be received from the user terminal or an external server.

In yet another aspect, there is provided a server for providing a function based on a movement of the user terminal, the server including: a memory storing instructions, and a processor configured to execute the instructions to: receive current location information of the user terminal from the user terminal; determine whether the current location information is associated with user information of the user terminal; and generate at least one function based on a result of the determination; and transmit the at least one function to the user terminal.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

As used herein, the singular forms "a", "an," and "the" are intended to include the plural forms as well, unless the context clearly indicates otherwise.

Each of the above-described operations may be performed irrespective of the listed order, except for a case where the operations must be performed in the listed order due to a special cause-effect relation of the operations.

It will be further understood that the terms "comprise", "include", "have", etc. when used in this specification, specify the presence of stated functions, integers, steps, operations, elements, components, and/or combinations of them but do not preclude the presence or addition of one or more other functions, integers, steps, operations, elements, components, and/or combinations thereof.

Hereinafter, the present disclosure will be described with reference to the attached drawings.

Figure 1:
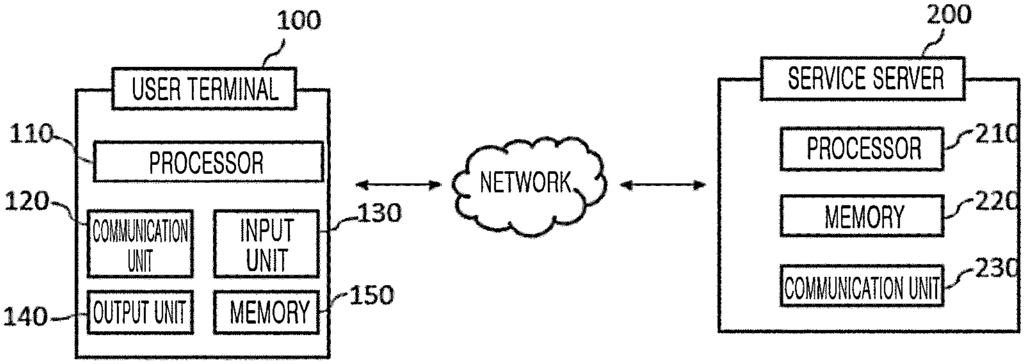
FIG. 1 is a diagram illustrating an example of a network environment according to an embodiment of the present disclosure.

FIG. 1 is a diagram illustrating an example of a network environment according to an embodiment of the present disclosure.

According to various embodiments, a user terminal 100 may be connected to a service server 200 through a network. Communication schemes for the network is not limited. The communication schemes may include not only a communication scheme to utilize a telecommunication network (for example, a mobile communication network, wired Internet, wireless Internet, and a broadcast network), but also a short-range radio communication scheme.

According to various embodiments, the user terminal 100 may be, for example, a smartphone, a tablet personal computer, a mobile phone, a video phone, an e-book reader, a desktop personal computer, a laptop personal computer, a netbook computer, a workstation, a server, a personal digital assistant (PDA), a portable multimedia player (PMP), an MP3 player, a mobile medical device, a camera, or a laptop computer, a netbook computer, a workstation, a server, a personal digital assistant (PDA), a portable multimedia player (PMP), an MP3 player, a mobile medical device, a camera, or a wearable device.

Referring to FIG. 1, according to various embodiments, the user terminal 100 may include a processor 110, a communication unit 120, an input unit 130, an output unit 140, and a memory 150. In one embodiment, at least one of the components of the user terminal 100 may be omitted or another component may be additionally provided.

The processor 110 may control a plurality of hardware or software components connected to the processor 110, and may also perform various data processing and operations. The processor 110 may execute an application by controlling the overall operation of the communication unit 120, the input unit 130, the output unit 140, and the memory 150.

According to various embodiments of the present disclosure, the processor 110 may recognize and detect a movement of the user terminal 100 using sensors embedded in the user terminal 100 (e.g., an acceleration sensor, a gyro sensor, a proximity sensor, an RGB sensor, a brightness sensor, a Hall sensor, a motion sensor, a temperature/humidity sensor, a barometer, a geomagnetic sensor, a heartbeat sensor, a fingerprint recognition sensor, etc.).

The processor 110 according to one embodiment may determine whether a detected movement of the user terminal 100 is a movement preset by the user. For example, the user terminal 100 may be configured to activate a user interface corresponding to function information when the user terminal 100 is shaken a predetermined number of times (e.g., once, twice, three times, four times, etc.) in a direction such as left to right or up and down.

According to various embodiments, when the movement of the user terminal 100 corresponds to a movement preset by the user terminal 100 (e.g., moving twice left-right, once up-down, etc.), the processor 110 may confirm the current location information. In one embodiment, the processor 110 may transmit the current location information of the user terminal 100 to the service server 200 through the communication unit 120. The current location information of the user terminal 100 may be confirmed through a Global Positioning System (GPS), a WiFi Positioning System (WIPS), a location processing platform, or the like.

In one embodiment, the movement preset by the user terminal 100 may be an angle, an acceleration value, or an angular velocity value preset by a user of the user terminal 100, a manufacturer of the user terminal 100, or a server (e.g., a service server 200) providing an application for the user terminal 100. For example, the acceleration value or angular velocity value of the user terminal 100 may be an angle (e.g., roll, pitch, yaw) value and an acceleration or angular velocity value sensed by a speed sensor and/or a gyro sensor of the user terminal 100. When a movement of the user terminal 100 is detected by a sensor, the processor 110 may determine whether the detected movement satisfies a movement angle, acceleration value, and/or angular velocity value preset by the user terminal 100.

According to various embodiments, the processor 110 may identify at least one function to be shown on a screen of the user terminal 100. Here, at least one function may be determined based on whether user information of the user terminal 100 is associated with current location information of the user terminal 100. Here, the user information may be, for example, place reservation information of the user terminal 100, identity authentication information, coupon information, schedule information, access control pass view information, membership view information, payment method information of the user terminal 100, and the like.

According to various embodiments, at least one function may be determined based on whether information of a place (e.g., a restaurant, a hotel, a store, an exhibition, a company, etc.) located within a preset distance from the current location information of the user terminal 100 is associated with user information of the user terminal 100 (e.g., reservation information of the account of the user terminal 100, schedule information of the user terminal 100, employee information of the company of the user terminal 100, etc.).

Based on whether the current location information determined by the user terminal 100 is associated with the user information stored in the memory 150, the processor 110 may identify at least one function to be shown on the screen of the user terminal 100. In another embodiment, the processor 110 may receive data on at least one function from the service server 200. Based on the received data, the processor 110 may identify at least one function to be shown on the screen of the user terminal 100.

According to various embodiments, the service server 200 may determine whether the current location information of the user terminal 100 is associated with the user information of the user terminal 100, and based on a result of the determination, the service server 200 may generate a signal regarding at least one function. The service server 200 may transmit at least one generated function to the user terminal 100.

According to various embodiments, the processor 110 may display a user interface corresponding to one of the at least one identified function on the screen of the user terminal 100.

The communication unit 120 may establish communication between the user terminal 100 and an external electronic device. For example, the communication unit 120 may be connected to a network through wireless or wired communication to communicate with an external electronic device (e.g., an external server) or the service server 200.

The input unit 130 may serve as an interface capable of transmitting commands or data input from a user or another external device to other component(s) of the user terminal 100. In addition, the input unit 130 may output commands or data received from the other component(s) of the user terminal 100 to the user or other external device(s). For example, the input unit 130 may be a touchscreen module, a keyboard, a mouse, buttons, a camera, a stylus, a microphone, etc.

The user terminal 100 may receive a user's interaction through the input unit 130. The interaction refers to an act of the user operating the input unit 130 to input information reflecting the user's selection or intention into the user terminal 100. For example, the interaction may be touching a touch on a touchscreen, a click on a mouse, typing on a keyboard, sound input from a microphone, image capture from a camera, movement recognition from a motion sensor, etc.

The output unit 140 may output various types of information. The output unit 140 may be a display, a touch screen, a speaker, a vibration generator, a tactile generator, etc. For example, the output unit 140 may display various contents (e.g., text, images, videos, icons, or symbols) to the user. According to various embodiments, the output unit 140 may be a device (e.g., Bluetooth earphones) connected to the user terminal 100 via wired or wireless communication (e.g., Bluetooth or other short-range wireless communication protocols) to receive signals and output information.

The memory 150 may perform functions as a storage medium and store a number of application programs running on the user terminal 20, and data and commands for operating the user terminal 20. The memory 150 may be provided in the form of any of various hardware storage devices such as an ROM, an RAM, a flash drive, a hard drive, etc. or may be provided in the form of web storage. In one embodiment, an application (hereinafter referred to as "application") associated with a messenger service may be stored in the memory 150.

According to various embodiments of the present disclosure, the service server 200 may be implemented as a computer apparatus or a plurality of computer apparatuses that provides instructions, codes, files, contents, services, and the like. The service server 200 may be a server capable of transmitting and receiving information through communication with the user terminal 100 over a network.

According to various embodiments, the service server 200 may be a device that provides a messenger service to the user terminal 100. The user terminal 100 may be a device that uses a messenger service provided by the service server 200. The messenger service may be a service that allows a plurality of users to send or receive messages with respect to each other through a platform provided by the service server 200. Here, a message may include all transmittable data, such as a text, a photo, a video, a voice file, and an emoticon.

The service server 200 may include a processor 210, a memory 220, and a communication unit 230. The processor 210 may control the overall operation of the memory 220 and the communication unit 230. The memory 220 may perform functions as a storage medium and store a number of application programs running on the service server 200, and data and commands for operation of the service server 200. In one embodiment, the memory 220 may be provided in the form of any of various hardware storage devices such as an ROM, an RAM, a flash drive, a hard drive, etc. or may be provided in the form of web storage. The communication unit 230 may communicate with the user terminal 100 through a network in a wired or wireless manner.

The processor 210 according to an embodiment of the present disclosure may receive current location information of the user terminal 100 from the user terminal 100 through the communication unit 230. The processor 210 may generate data to provide a relevant function by determining whether information of a place located within a predetermined distance from the current location information of the user terminal 100 is associated with user information of the user terminal 100 (e.g., identity authentication information, coupon information, and schedule information of the user terminal 100). For example, if a restaurant reserved by a user, which is stored in memory 220, is located within 1 km from the current location information of the user terminal 100, the processor 210 may generate a function that enables the user terminal 100 to display the reservation information for the restaurant.

The processor 210 may transmit at least one generated function to the user terminal 100 through the communication unit 230.

Figure 2:
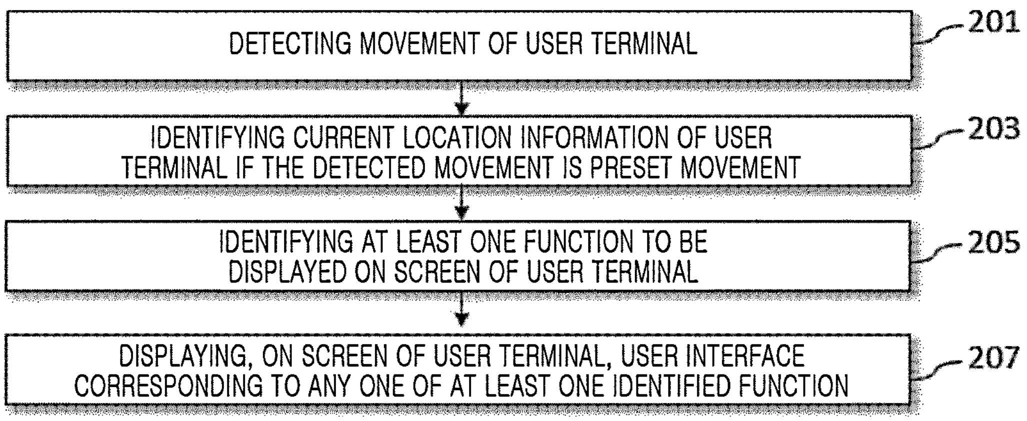
FIG. 2 is a flowchart illustrating an example of a process in which a user terminal provides a customized function according to an embodiment of the present disclosure.

FIG. 2 is a flowchart illustrating an example of a method for providing a function based on a movement of a user terminal according to an embodiment of the present disclosure.

Operations described below may be performed irrespective of the listed order, except for a case where the operations must be performed in the listed order due to a special cause-effect relation of the operations. However, hereinafter, for convenience of explanation, it will be described in the assumption that the respective operations are performed in the listed order.

In operation 201, the user terminal 100 may detect a movement of the user terminal 100 using a sensor (e.g., a motion sensor, an acceleration sensor, a gyro sensor, etc.). According to one embodiment, the user terminal 100 may perform various functions by detecting a movement of the user terminal 100 using a sensor.

In operation 203, when the movement of the user terminal 100 detected using the sensor is a preset movement, the user terminal 100 may identify the current location information of the user terminal 100. Here, the preset movement may be a specific movement of the user terminal 100 preset by the user of the user terminal 100, the manufacturer of the user terminal 100, or the service server 200 to activate a certain function or application. For example, the preset movement may be a predetermined acceleration or angular velocity value (e.g., tilting by 50 degrees for 10 seconds, etc.) of the user terminal 100 in the Z-axis direction (yaw) or in the side-to-side direction (roll).

In one embodiment of the present disclosure, when a detected movement of the user terminal 100 corresponds to the preset movement direction and an acceleration value greater than or equal to a preset threshold, the user terminal 100 may confirm the current location information. The user terminal 100 may confirm the current location information through GPS positioning technology, a satellite-based positioning method, Bluetooth, ultra-wideband, radio-frequency identification (RFID), wireless fidelity (WiFi), Bluetooth Low Energy (BLE), ultra-wideband (UWB), or the like.

In operation 205, the user terminal 100 may identify at least one function to be shown on the screen of the user terminal 100. In one embodiment, the user terminal 100 may identify at least one function to be shown on the screen of the user terminal 100, based on whether the current location information of the user terminal 100 is associated with user information stored in the user terminal 100.

In an additional embodiment, the user terminal 100 may transmit the current location information of the user terminal 100 to the service server 200 in response to a preset movement of the user terminal 100. The service server 200 may determine whether the current location information received from the user terminal 100 is associated with the user information of the user terminal 100 stored in the service server 200. The service server 200 may generate at least one function based on a result of the determination and transmit at least one generated function to the user terminal 100.

Here, at least one function is information generated by the service server 200 and may be determined based on whether the current location information of the user terminal is associated with the user information of the user terminal 100. For example, when the user terminal 100 has a reservation for a restaurant located within 1 km from the current GPS location of the user terminal 100, the service server 200 may generate a trigger signal to provide reservation information for the restaurant on the screen of the user terminal 100 and may transmit the generated trigger signal to the user terminal 100.

According to various embodiments, the service server 200 may receive schedule information of the user terminal 100 from the user terminal 100 or an external server. The service server 200 according to one embodiment may confirm the schedule of the user terminal 100 (e.g., reservation for Pangyo Hotel on Feb. 21, 2023, reservation at Pangyo Cafe on Feb. 23, 2023) and generate at least one function by comparing the confirmed schedule with the location information of the user terminal 100. For example, when a shaking movement of the user terminal 100 is detected on Feb. 21, 2023, the service server 200 may generate a function based on the current location information of the user terminal 100 and information indicating "reservation for Pangyo Hotel on Feb. 21, 2023", which is stored in the user terminal 100. The user terminal 100 may receive from the service server 200 a function providing the information indicating "reservation for Pangyo Hotel on Feb. 21, 2023."

In an additional embodiment, when a shaking movement of the user terminal 100 is detected near Pangyo Hotel on Feb. 22, 2023, the service server 200 may not generate a function providing the reservation information "reservation for Pangyo Hotel on Feb. 21, 2023" which predates Feb. 22, 2023. For example, the user terminal 100 may receive from the service server 200 a function excluding the information indicating "reservation for Pangyo Hotel on Feb. 21, 2023."

According to various embodiments, the service server 200 may recommend a credit card associated with a place located within a preset distance from the current location information of the user terminal 100 among credit cards of the user terminal 100. In one embodiment, the user terminal 100 or the service server 200 may store credit card information such as credit card type, credit card number, expiration date, CVC, credit card password, etc., associated with an account of the user terminal 100. Based on information stored on an external server or the service server 200, the service server 200 may check the discount benefits provided by each stored credit card of the user terminal 100, point accumulation information, etc., and may determine information of a place where the checked discount benefits is applicable. For example, when the service server 200 checks that one of the credit cards of the user terminal 100 offers discount benefits for a restaurant located within a preset distance (e.g., 100 m) from the current GPS location of the user terminal 100, the service server 200 may transmit relevant information (e.g., at least one function) to the user terminal 100 to provide a user interface recommending the corresponding credit card.

In an additional embodiment, the user terminal 100 may store information on a plurality of credit cards of the account of the user terminal 100 through a separate credit card payment application. Afterwards, when the user terminal 100 activates a shake function in front of a point of sales (POS) terminal supporting payment at a certain store, the user terminal 100 may receive information about the most suitable credit card for the store (e.g., discount benefits, affiliation benefits, credit card point accumulation, etc.) from the service server 200. Based on the received information (e.g., at least one function), the user terminal 100 may automatically select a credit card prioritized by the service server 200 through the credit card payment application as the default credit card.

In operation 207, the user terminal 100 may display a user interface corresponding to one of the at least one identified function on the screen of the user terminal 100.

According to various embodiments, the user terminal 100 may display an application on the screen of the user terminal 100 in response to at least one function received from the service server 200. For example, when the user terminal 100 receives at least one function providing reservation information for a specific place (e.g., a restaurant, a hotel, a museum, etc.) of the user terminal 100 from the service server 200, an application providing the corresponding reservation information may be displayed on the screen of the user terminal 100.

FIGS. 3 to 6 are diagrams illustrating examples of providing a function based on user location information and user information in response to detecting a movement of the user terminal 100 according to an embodiment of the present disclosure.

Figure 3:
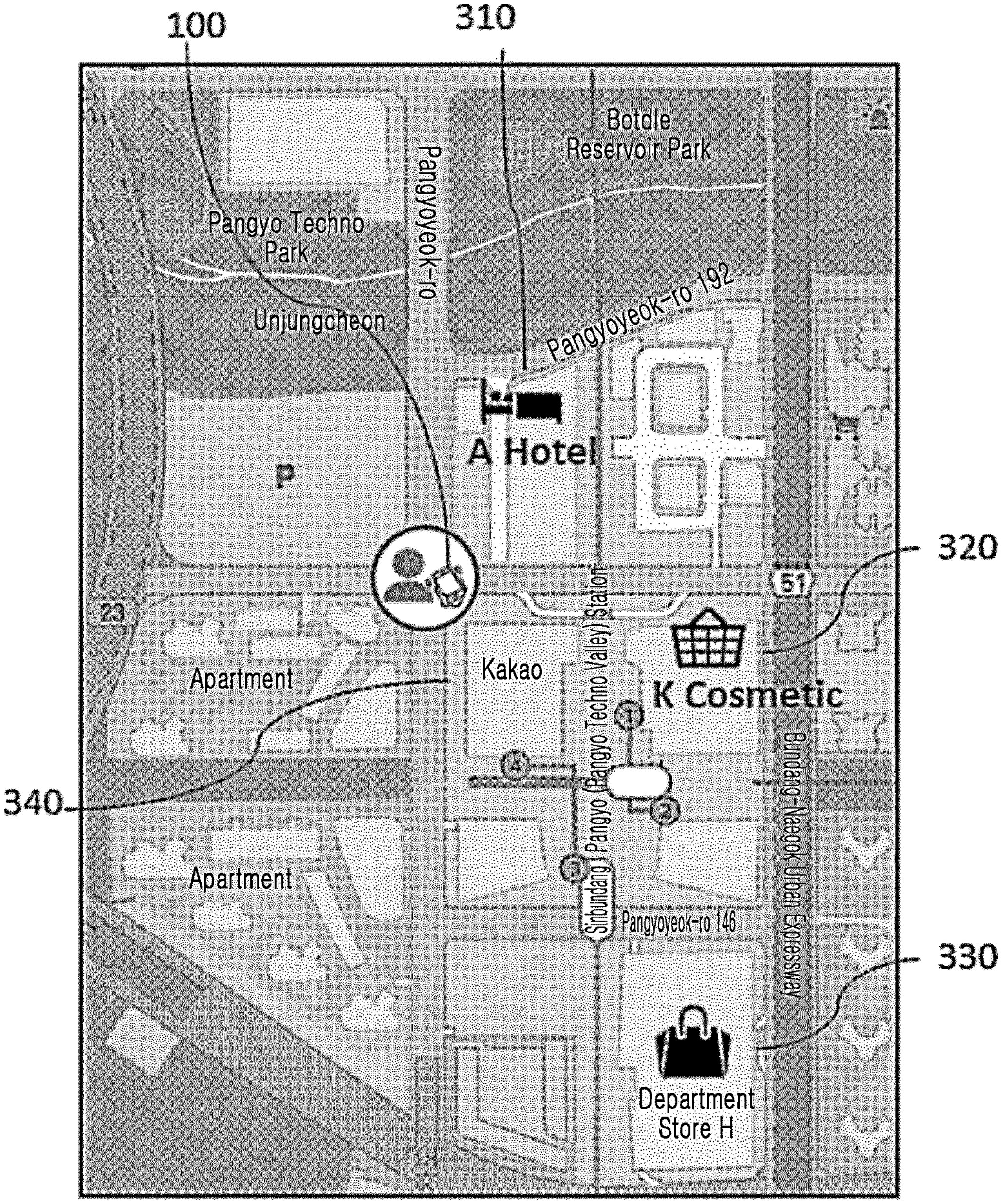
FIGS. 3 to 6 are diagrams illustrating examples of providing a function based on location information and user information of a user terminal in response to detecting a movement of the user terminal according to an embodiment of the present disclosure.

Referring to FIG. 3, when a shaking movement of the user terminal 100 is detected, the user terminal 100 may confirm the current location information (e.g., GPS information, etc.) of the user terminal 100 in operations 201 and 203. The user terminal 100 may determine whether the current location information of the user terminal 100 is associated with the user information stored in the user terminal 100. Based on a result of the determination, the user terminal 100 may identify at least one function to be shown on the screen of the user terminal 100 in operation 205. The user terminal 100 may display a user interface corresponding to the at least one identified function on the screen of the user terminal 100 in operation 207.

According to various embodiments, the user terminal 100 may transmit the current location information of the user terminal 100 to the service server 200. The service server 200 may identify a place (e.g., a hotel, a restaurant, a museum, a convenience store, etc.) within a predetermined distance (e.g., 300 meters, 500 meters, etc.) from the received current location information of the user terminal 100, and determine whether the identified place is associated with account information of the user terminal 100, which is stored in the service server 200.

The service server 200 may identify places located within a predetermined distance from the GPS information of the user terminal 100 and compare the identified places with the user information stored in the service server 200. The service server 200 may identify user-associated information of places 310, 320, 330, and 340 among a plurality of places associated with the account of the user terminal 100, and may generate at least one function corresponding to the information of the identified user-associated places 310, 320, 330, and 340. For example, when the service server 200 confirms that the user has a reservation at A Hotel 310 located within a predetermined distance (e.g., 300 meters, 400 meters, etc.) from the current GPS location of the user terminal 100, the service server 200 may generate at least one function so that the user terminal 100 can provide the reservation information for A Hotel 310, which is information of a user-associated place.

The service server 200 may transmit at least one generated function to the user terminal 100. Based on at least one received function from the service server 200, the user terminal 100 may identify at least one function to be shown on the screen of the user terminal 100 in operation 205.

Figure 4:
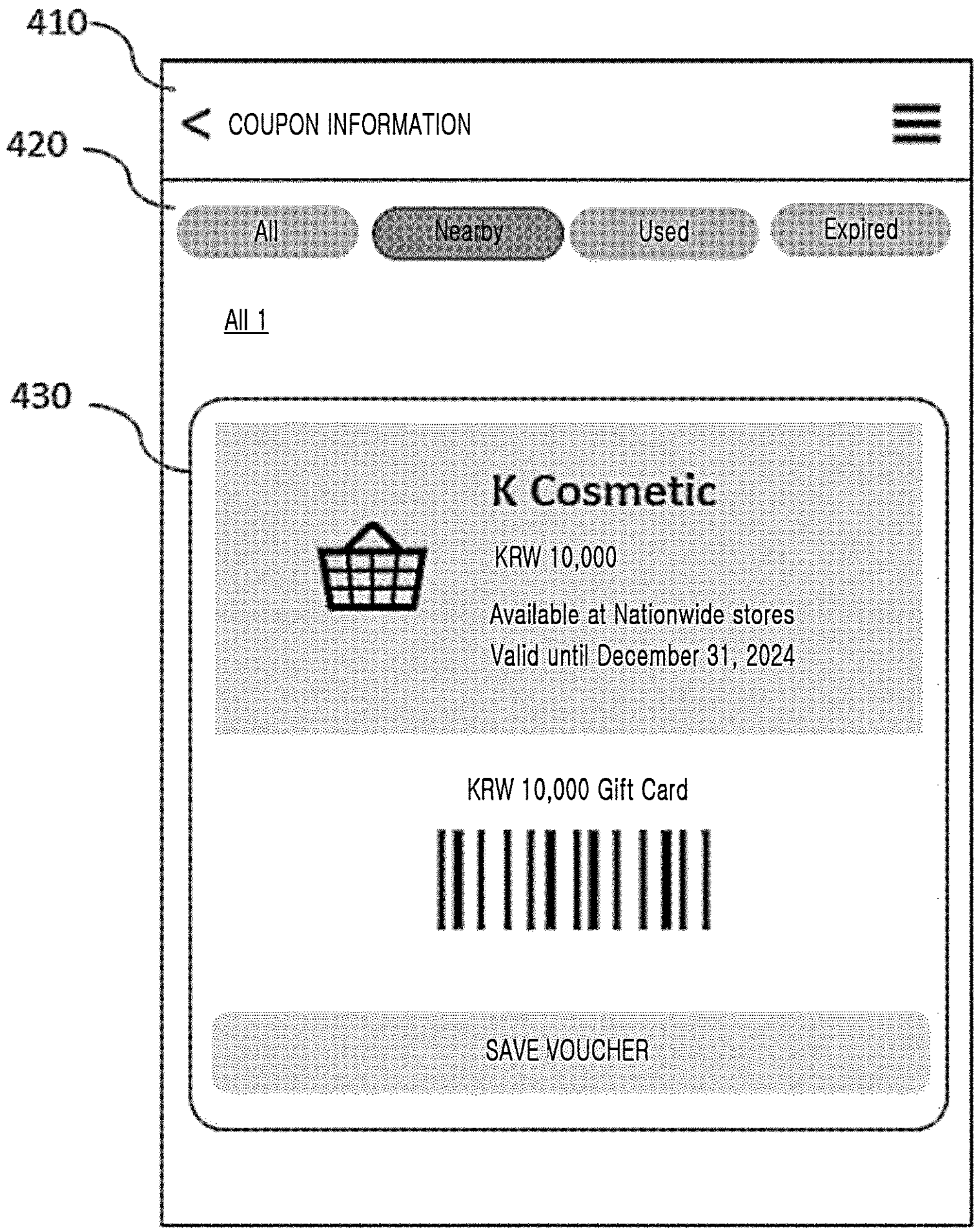

Referring to FIG. 4, the user terminal 100 may display a user interface corresponding to one of the at least one identified function on the screen of the user terminal 100, in operation 207.

According to various embodiments of the present disclosure, in a case where a preset movement of the user terminal 100 is detected, if coupon information for K Cosmetic 320 is stored on the user terminal 100 and the user terminal 100 is located within a predetermined distance (e.g., 300 meters) from K Cosmetic 320, the user terminal 100 may display a coupon information interface 410 on the screen of the user terminal 100. In another embodiment, the user terminal 100 may display the coupon information interface 410 on the screen of the user terminal 100 based on at least one function received from the service server 200.

According to various embodiments, the coupon information interface 410 may include a coupon menu interface 420 providing all coupon information stored on the user terminal 100, coupon information for places located within a predetermined distance (e.g., 300 meters) from the current location of the user terminal 100, usage completion information, and coupon expiration period information. In one embodiment, the coupon information interface 410 may include a coupon provisioning interface 430 providing information such as stores where the coupon is applicable, discount amount applied by the coupon, coupon validity period information, QR information, etc.

Figure 5:
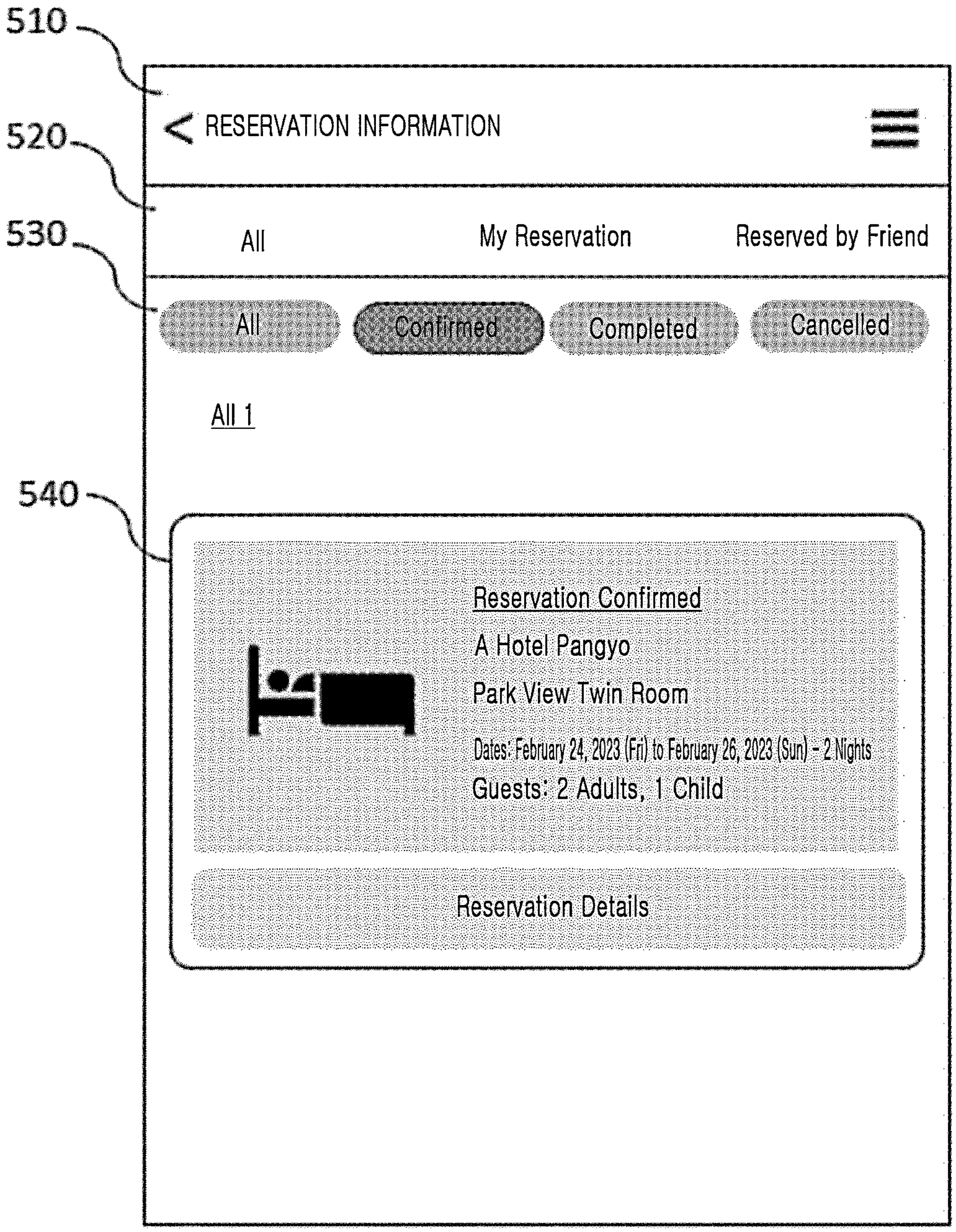

Referring to FIG. 5, the user terminal 100 may, in operation 207, display a user interface corresponding to one of at least one identified function on the screen of the user terminal 100.

According to various embodiments of the present disclosure, in a case where a preset movement of the user terminal 100 is detected, if the user terminal 100 has stored therein reservation information for A Hotel 310 and is located within a predetermined distance (e.g., 300 meters) from A Hotel 310, the user terminal 100 may display on the screen a reservation information interface 510 providing information on reservation details for A Hotel 310.

According to various embodiments, the reservation information interface 510 may display a reservation menu interface 520, a reservation type interface 530, and a reservation details interface 540. The reservation menu interface 520 may include a user interface providing information on reservations made by the account of the user terminal 100, reservation information shared from an external account (e.g., another account), and all reservation information. The reservation type interface 530 may include a user interface providing information on all reservations, reservations, completed reservations, and canceled reservations associated with the account of the user terminal 100. The reservation details interface 530 may include a user interface providing reservation information of the account of the user terminal 100 (e.g., confirmed reservation, hotel name, type of reserved room, reservation date, number of guests for the reservation, etc.).

In another embodiment, when the user terminal 100 receives from the service server 200 a trigger signal (e.g., at least one function) to provide reservation information for A Hotel 310, the user terminal 100 may display on the screen the reservation information interface 510 providing information on reservation details (e.g., reservation information, reservation dates, number of guests for reservation, etc.) for A Hotel 310.

Figure 6:
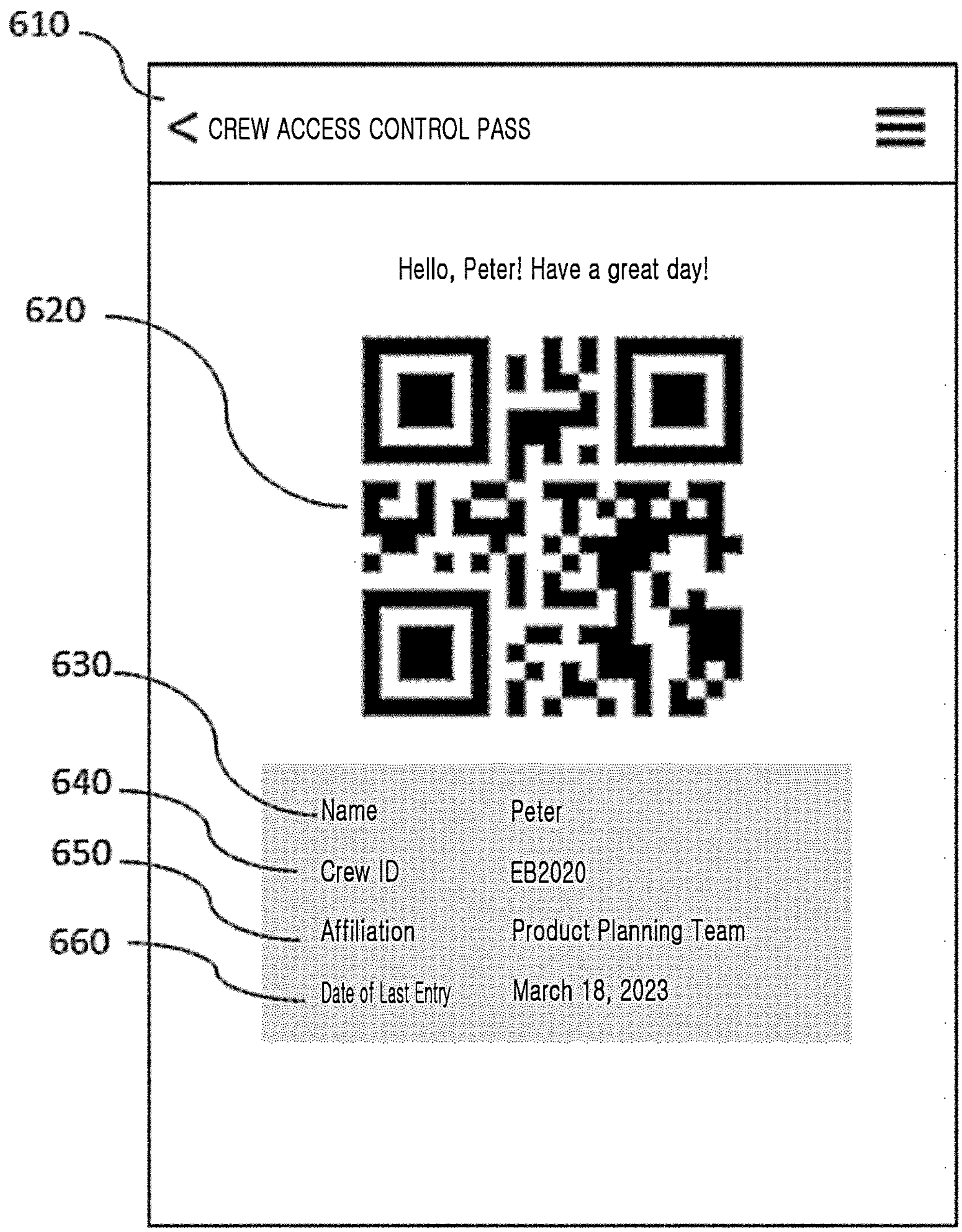

Referring to FIG. 6, the user terminal 100 may, in operation 207, display a user interface corresponding to one of the at least one identified function on the screen of the user terminal 100.

According to various embodiments of the present disclosure, in a case where a preset movement of the user terminal 100 is detected, if user information (e.g., Kakao employee information, etc.) associated with Kakao Corp 340 is stored in the user terminal 100 and the user terminal 100 is located within a predetermined distance (e.g., 200 meters) from Kakao Corp 340, the user terminal 100 may display on the screen an access control pass interface 610 for accessing Kakao Corp 340.

According to various embodiments, the access control pass interface 610 may include QR information 620 for accessing an employee-only entrance or the like, a name 630 of the account of the user terminal 100 (e.g., Peter), an ID 640 (e.g., Crew ID: EB2020), an affiliation 650 (e.g., Product Planning Team), and a date of the last entry 660 of the user terminal 100.

In another embodiment, the user terminal 100 receives from the service server 200 a trigger signal to provide QR information required for access to Kakao Corp 340, the user terminal 100 may display on the screen a user interface corresponding to the QR information for access to Kakao Corp 340.

Figure 7:
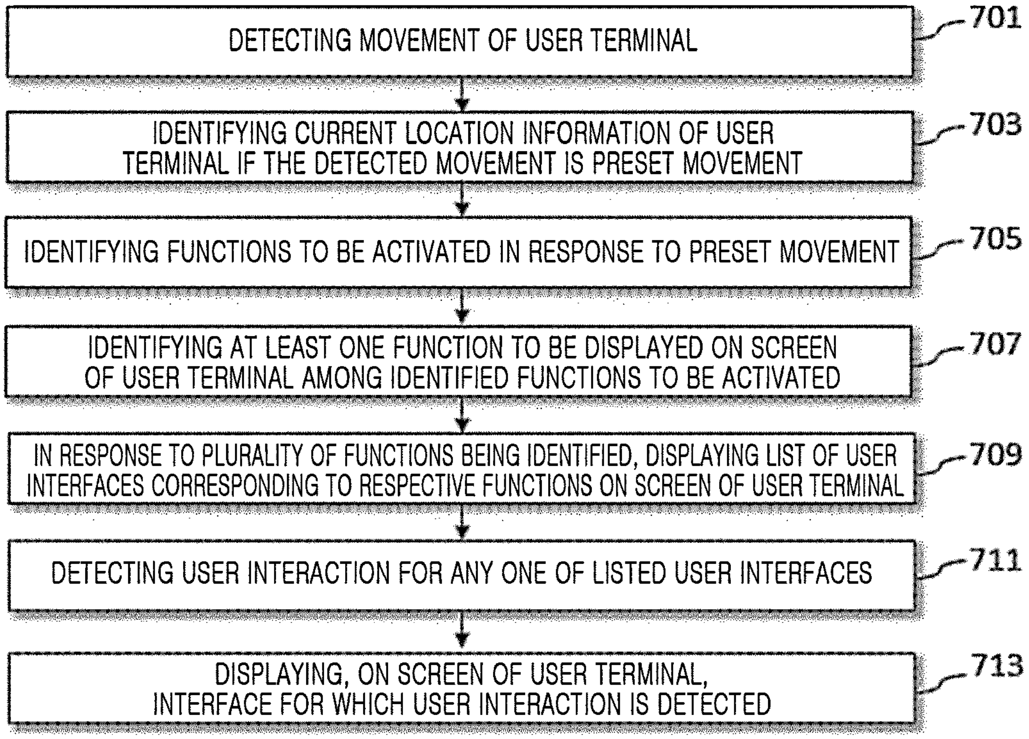
FIG. 7 is a flowchart illustrating an example of displaying a list of user interfaces associated with a plurality of functions in response to detecting a movement of a user terminal according to an embodiment of the present disclosure.

FIG. 7 is a flowchart illustrating an example of displaying a list of user interfaces associated with a plurality of functions in response to detecting a movement of the user terminal 100 according to an embodiment of the present disclosure.

Since operations 701 and 703 correspond to operations 201 and 203 of FIG. 2, detailed descriptions thereof will be omitted.

In operation 705, the user terminal 100 may determine functions to be activated in response to a preset movement.

According to various embodiments, the user terminal 100 may determine types of the functions to be activated in response to detecting a shaking movement of the user terminal 100. In one embodiment, the user terminal 100 may identify a user interaction for selecting a function (e.g., reservation information, coupon information, access control pass information, membership credit information, etc.) that is activated based on a shaking movement of the user terminal 100. For example, the user terminal 100 may identify a user interaction for selecting only "reservation information" and "coupon information" among multiple functions or solely "membership points accumulation information" as functions to be activated based on the shaking movement of the user terminal 100.

According to various embodiments, the user of the user terminal 100 and a server (e.g., service server 200) connected to the user terminal 100 via networking may select and change the type of a function to be activated in response to detecting a shaking movement of the user terminal 100.

In operation 707, the user terminal 100 may identify at least one function to be shown on the screen of the user terminal 100 among the activated functions.

According to various embodiments, the user terminal 100 may display, on the screen, only a user interface corresponding to a function preset to be activated in response to detecting a shaking movement of the user terminal 100 among at least one function determined by the service server 200. For example, even in a case where a plurality of functions (e.g., reservation information, coupon information, access control pass information, etc.) is determined by the service server 200, if a function preset to be activated in response to detecting a shaking movement of the user terminal 100 is solely "reservation information", the user terminal 100 may only display a user interface corresponding to "reservation information" on the screen.

In operation 709, when a plurality of functions is identified, the user terminal 100 may display a list of user interfaces corresponding to the respective functions on the screen.

For example, the user terminal 100 may determine that a user interface providing "reservation history information" of the user terminal 100 and a user interface providing "coupon information" are applications selected to be activated in response to detecting a shaking movement of the user terminal 100. In such a scenario, when the user terminal 100 receives from the service server 200 a signal requesting the provision of the user interfaces providing "reservation history information" and "coupon information", the user terminal 100 may decide to display functions to be shown on the screen, through the user interfaces respectively providing "reservation history information" and "coupon information."

In operation 711, a user interaction for any one of the user interfaces listed on the user terminal 100 may be detected. For example, the user interfaces corresponding to the functions of "reservation history information" and "coupon information" may be shown on the screen of the user terminal 100, and a user interaction for the function of "coupon information" may be detected.

According to various embodiments, when the user terminal 100 displays a list of user interfaces corresponding to respective functions on the screen, the user terminal 100 may determine the priority of the listed user interfaces corresponding to respective applications based on the recent history information of the user terminal 100 for each function. For example, in a case where the user terminal 100 displays the user interface providing the function of "reservation history information" of the user terminal 100 and the user interface providing the function of "coupon information" together, if the most recently activated application provides the function of "coupon information", the user terminal 100 may place the corresponding user interface at the top of the screen of the user terminal 100.

In an additional embodiment, when the user terminal 100 displays a list of user interfaces corresponding to a plurality of functions, the user terminal 100 may place the user interface providing a function available at a closer location based on the current location information of the user terminal 100 at the top of the screen of the user terminal 100. For example, in a case where a place associated with "reservation history information" of the user terminal 100 is 500 meters away from the user terminal 100 and a place associated with the function of "coupon information" is 600 meters away, the user terminal 100 may place the user interface providing "reservation history information" closer to the location of the user terminal 100 at the top of the screen of the user terminal 100.

In operation 713, the user terminal 100 may display, on the screen, a user interface for which a user interaction is detected. For example, the user interfaces corresponding to the functions of "reservation history information" and "coupon information" may be shown on the screen of the user terminal 100, and a user interaction for the function of "coupon information" may be detected. In response to the user interaction, the user terminal 100 may display the coupon information interface 410 providing information such as stores where the coupon is applicable, discount amount applied by the coupon, coupon validity period, QR information, etc.

Figure 8:
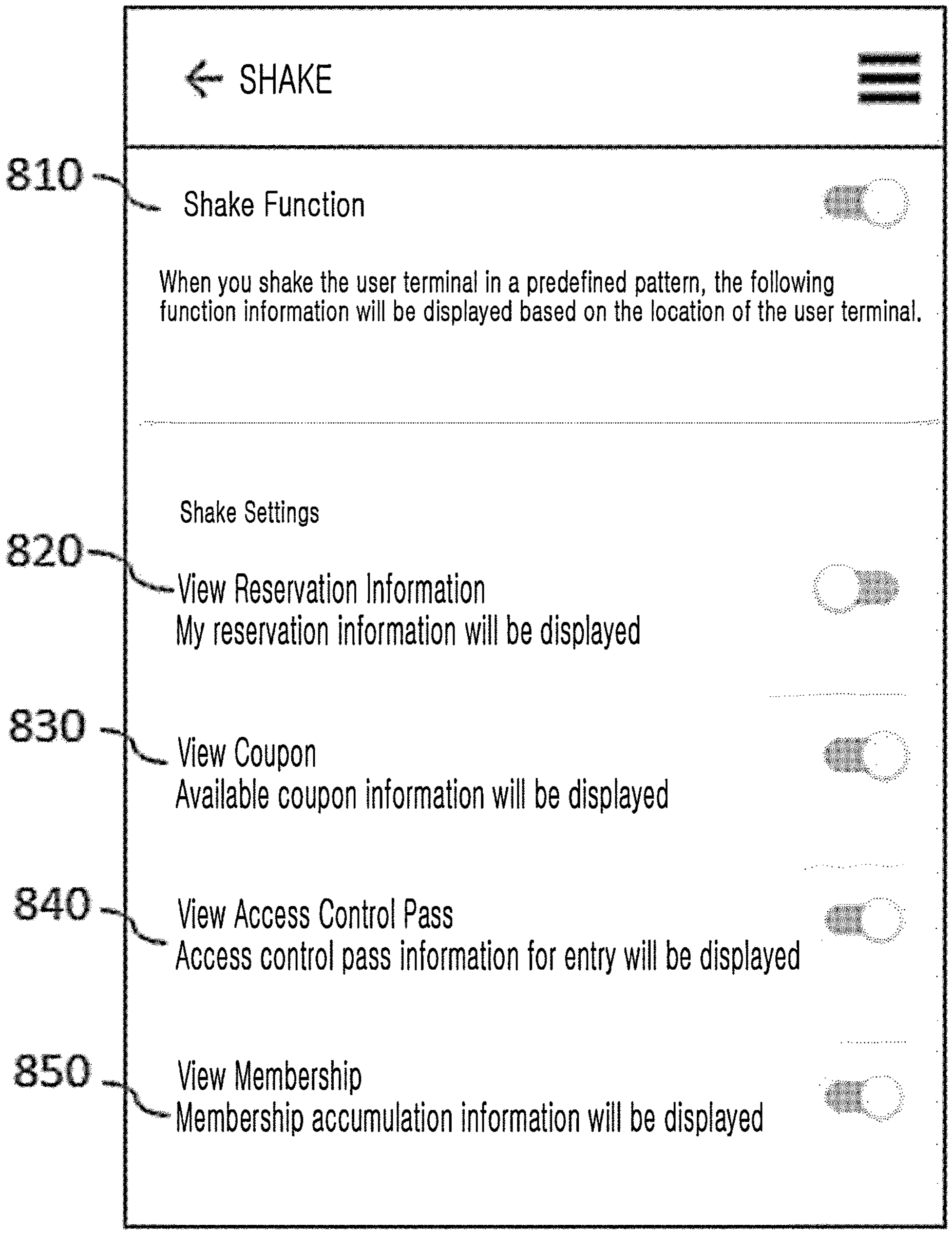
FIG. 8 is a diagram illustrating an example of selecting a function to be activated based on a preset movement of a user terminal according to an embodiment of the present disclosure.

FIG. 8 is a diagram illustrating an example of selecting a function activated based on a preset movement of the user terminal 100 according to an embodiment of the present disclosure.

According to various embodiments of the present disclosure, the user terminal 100 may provide a relevant user interface for selecting a function to be activated based on a shaking movement of the user terminal 100. In one embodiment, the user terminal 100 may provide a shake setting user interface 810 to the user, enabling the activation of a function based on detection of a shaking movement of the user terminal 100.

The user terminal 100 may activate various functions in response to detecting a shaking movement of the user terminal 100. For example, the user terminal 100 may provide user interfaces providing functions of View Reservation Information 820, View Coupon 830, View Access Control Pass 840, and View Membership 850. Here, View Reservation Information 820 may provide information on a reservation made for a certain place (e.g., a restaurant, a hotel, a store, etc.) through a messenger application (e.g., KakaoTalk), View Coupon 830 may provide information on discount benefits available at offline stores, View Access Control Pass 840 may provide QR information allowing a user account to pass through a specific security system, and View Membership 850 may provide event and benefit information, and membership accumulation information, applicable at various locations.

Figure 9:
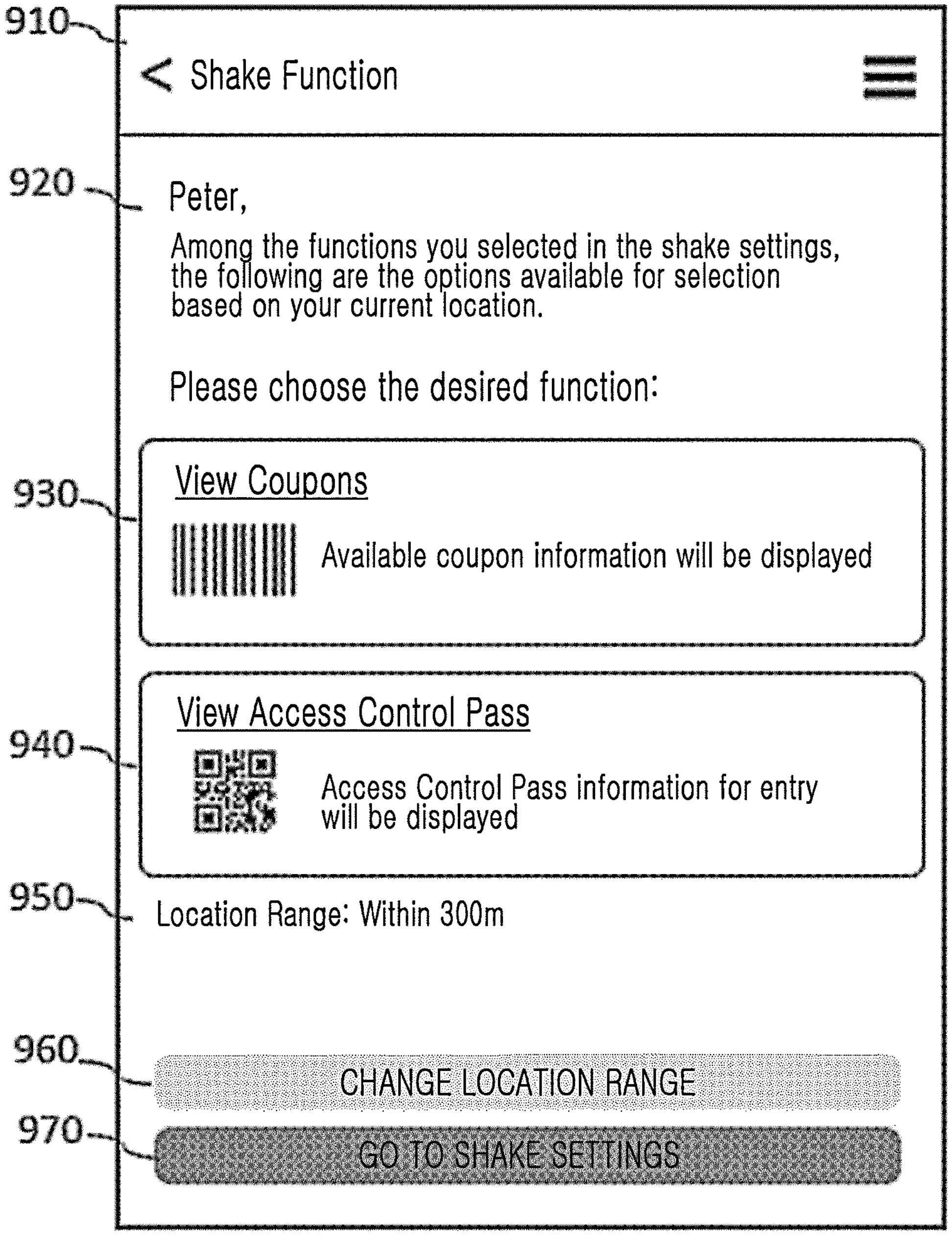
FIG. 9 is a diagram illustrating an example in which a user terminal displays a list of user interfaces associated with a plurality of functions according to an embodiment of the present disclosure.

FIG. 9 is a diagram illustrating an example in which the user terminal 100 displays a list of user interfaces associated with a plurality of functions according to an embodiment of the present disclosure.

According to various embodiments of the present disclosure, in response to detecting a shaking movement, the user terminal 100 may display, on the screen, a list of user interfaces corresponding to a plurality of functions, based on functions identified by the user terminal 100 or at least one function received from the service server 200, in operation 709.

For example, the user terminal 100 may display a shake function interface 910 in response to detecting a shaking movement of the user terminal 100. The Shake Function interface 910 may include a shake description interface 920, a View Coupon view interface 930, a View Access Control Pass interface 940, a Location Range interface 950, a Location Range Change interface 960, and a Shake Settings interface 970.

The shake description interface 920 may provide a description associated with the shake settings to the user of the user terminal 100. For example, if the account name of the user terminal 100 is "Peter," the user terminal 100 may display, on the screen, "Among the functions you selected in the shake settings, the following are the options available for selection based on your current location."

In one embodiment, among the functions activated by the user terminal 100, the user terminal 100 may display a user interface on the screen based on whether the current location information of the user terminal 100 is associated with the user information of the user terminal 100. The user terminal 100 may display the View Coupon interface 930 and the View Access Control Pass interface 940 on the screen.

The user terminal 100 may compare location information within a preset distance from the current location information of the user terminal 100 with the user information of the user terminal 100. For example, when the preset distance is a radius of 300 meters, the Range interface 950 indicating information that a location range is within 300 meters may be shown on the screen of the user terminal 100.

According to various embodiments, the user terminal 100 may provide the Location Range Change interface 960 to change a preset distance. For example, when comparing information of a place located within 300 meters from the current location information of the user terminal 100 with the user information of the user terminal 100, the user terminal 100 may change the preset distance of 300 meters to 100 meters, 240 meters, 400 meters, or the like through the Location Range Change interface 960.

According to various embodiments, the shake setting interface 970 may provide an interface to select a function to be activated in response to a shaking movement of the user terminal 100. For example, as shown in FIG. 8, through the shake setting interface 970, the user terminal 100 may provide a function to be activated in response to detecting shaking of the user terminal 100.

Figure 10:
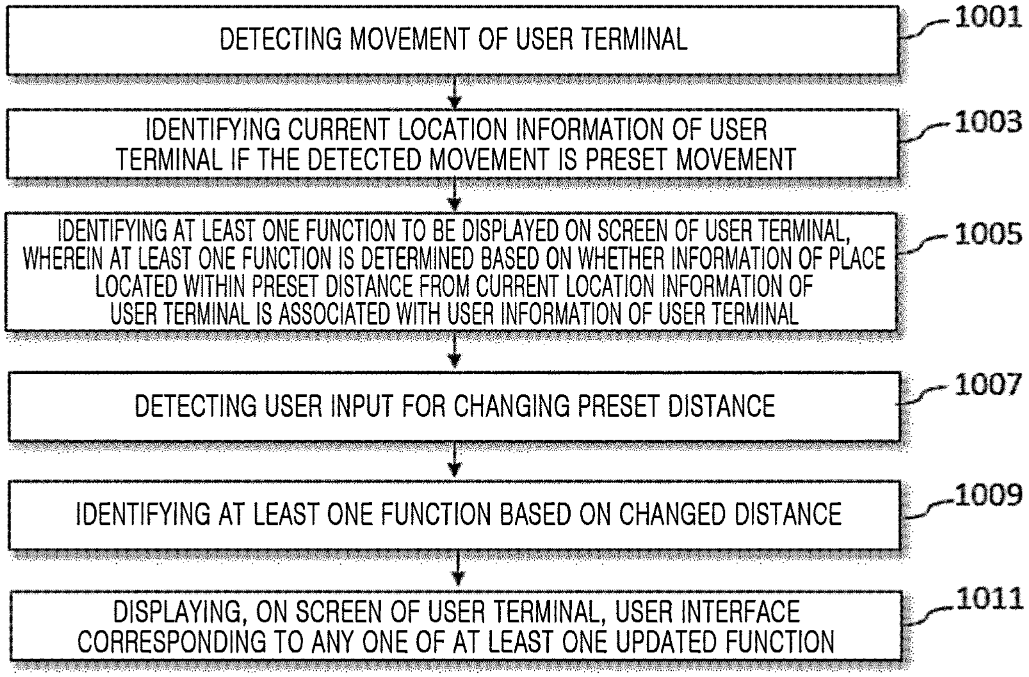
FIG. 10 is a flowchart illustrating an example of a process for providing a customized function to a user based on information of a place located within a distance selected by the user from current location information of a user terminal, according to an embodiment of the present disclosure.

FIG. 10 is a flowchart illustrating an example of a process for providing a user with a customized function based on information of a place located within a distance selected by the user from the current location information of the user terminal 100 according to an embodiment of the present disclosure.

Since operations 1001 and 1003 are substantially identical to operations 201 and 202 of FIG. 2, detailed descriptions thereof will be omitted.

In operation 1005, at least one function to be shown on the screen of the user terminal 100 may be identified. Here, at least one function may be determined based on whether information of a place located within a preset distance from the current location information of the user terminal 100 is associated with user information of the user terminal 100.

In operation 1007, the user terminal 100 may detect a user input for changing a preset distance. In one embodiment, the service server 200 may generate at least one function by determining whether information of a place located within a preset distance from the current location information of the user terminal 100 is associated with the place information of the user terminal 100. Here, the preset distance may be changed via a user input from the user terminal 100. For example, if the preset distance originally determined by the service server 200 is 400 meters from the current location of the user terminal 100, the preset distance may be changed to 500 meters, 600 meters, or the like from the current location of the user terminal 100 via a user input.

In operation 1009, the user terminal 100 may identify at least one function that has been updated based on the changed distance.

For example, the service server 200 may determine whether places located within 800 meters, which is a preset distance from the current location of the user terminal 100, are associated with the user information of the user terminal 100. Thereafter, when the user terminal 100 changes the preset distance to 600 meters, the service server 200 may determine whether the places located within 600 meters from the current location of the user terminal are associated with the user information of the user terminal 100. The service server 200 may transmit, to the user terminal 100, at least one function determined based on the changed distance.

In an additional example, in response to at least one function received, the user terminal 100 may update a user interface corresponding to the function to be shown on the screen of the user terminal 100. For example, the user terminal 100 may display a user interface corresponding to "reservation information of the user terminal 100" in response to the function received from the service server 200. Thereafter, in response to a changed function, the user terminal 100 may identify user interfaces respectively corresponding to "reservation information of the user terminal 100" and "coupon information."

In operation 1011, the user terminal 100 may display a user interface corresponding to one of the at least one updated function on the screen of the user terminal 100.

Figure 11:
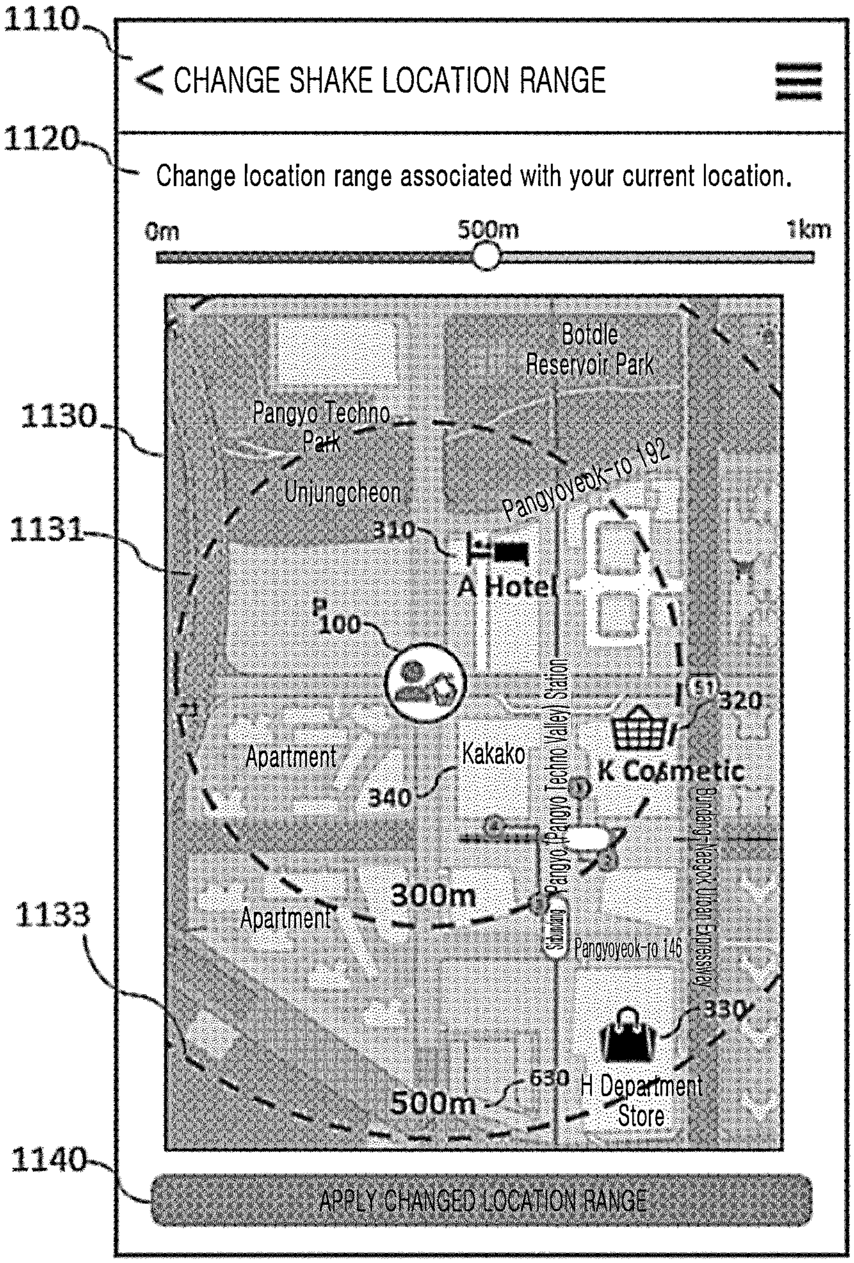
FIG. 11 is a diagram illustrating an example of a user interface for changing a distance on a user terminal according to an embodiment of the present disclosure.

FIG. 11 is a diagram illustrating an example of a user interface to change a distance regarding information of a place in the user terminal 100 according to an embodiment of the present disclosure.

According to various embodiments, the user terminal 100 may select a function to be activated based on a movement of the user terminal 100 through shake settings of the user terminal 100. In one embodiment, the user terminal 100 may activate the function of "reservation history view" to view reservation information for places located within a distance preset by the user through the shaking settings, or may activate the function of "coupon information" for the places located within the preset distance where coupons are applicable. According to various embodiments of the present disclosure, the user terminal 100 may provide a shaking location range change interface 1110 to change the preset distance from the current location of the user terminal 100. Referring to FIG. 11, the shaking location range change interface 1110 may include a distance change interface 1120, a map interface 1130, and a distance change application interface 1140.

The map interface 1130 displayed on the screen of the user terminal 100 may include information such as the current location information of the user terminal (e.g., GPS information), information regarding a predetermined range from the current location of the user terminal (e.g., a graphical user interface 1131 corresponding to 300 meters, and a graphical user interface 1133 corresponding to 500 meters), and information on associated places 310, 320, and 330.

According to various embodiments, the service server 200 may compare information of places located within 300 meters from the current GPS location of the user terminal 100 with the user information (e.g., place reservation information, coupon information, etc.) of the user terminal 100. Thereafter, when the user terminal 100 changes the distance to 500 meters through the distance change interface 1120 and the distance change application interface 1140, the service server 200 may generate at least one function by comparing the information of places located within 500 meters from the current GPS location of the user terminal 100 with the user information. The service server 200 may transmit at least one generated function to the user terminal 100.

For example, referring to FIG. 11, when the location range associated with the current location is set to 300 meters, the user terminal 100 or the service server 200 may, in operation 1009, compare places located within 300 meters from the current location information of the user terminal 100 with the user information (e.g., reservation information for A Hotel 310, coupon information for K Cosmetic 320, access information for Kakao Corp 340 etc.).

Here, when the user changes the location range to 500 meters through the distance change interface 1120 and the change application interface 1140, the user terminal 100 or the service server 200 may, in operation 1009, additionally compare H Department Store 330 located within 500 meters from the current location information of the user terminal 100, in addition to A Hotel 310, K Cosmetic 320, and Kakao Corp 340, with the user information (e.g., coupon information for H Department Store 330, gift card information, etc.).

In one embodiment, the user terminal 100 may, in operation 1011, display at least one function generated based on the changed distance on the screen of the user terminal 100.

Figure 12:
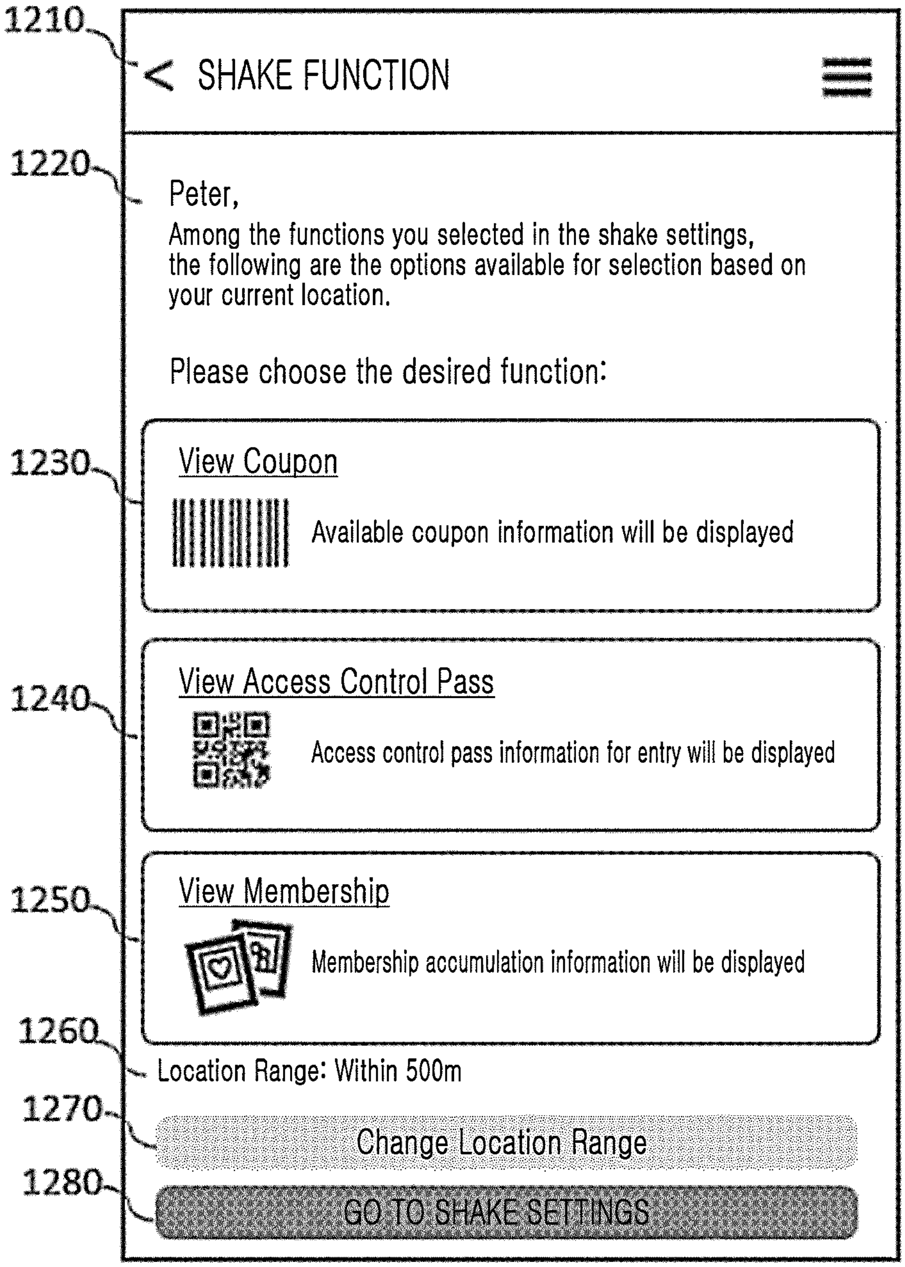
FIG. 12 is a diagram illustrating a user interface corresponding to a function updated in response to change of a distance according to an embodiment of the present disclosure.

FIG. 12 is a diagram illustrating a user interface corresponding to a function that is changed as a distance regarding place information changes on the user terminal 100, according to an embodiment of the present disclosure.

According to various embodiments, when the distance is changed to 500 meters through the distance change interface 1120 and the change application interface 1140, the user terminal 100 or the service server 200 may compare information of a place located within 500 meters from the current location of the user terminal 100 with the user information of the user terminal 100. Based on a result of the comparison, the user terminal 100 may display a user interface corresponding to each function on the screen of the user terminal 100.

For example, the user terminal 100 may display a Shake Function interface 1210 in response to detecting a shaking movement of the user terminal 100. The shake function interface 1210 may include a shake description interface 1220, a View Coupon interface 1230, a View Access Control Pass interface 1240, a View Membership interface 1250, a Location Range interface 1260, a Location Range Change interface 1270, and a Shake Setting interface 1280.

In one embodiment, among the functions activated by the user terminal 100, the user terminal 100 may display a user interface on the screen based on whether the current location information of the user terminal 100 is associated with the user information of the user terminal 100. Based on a result of the determination, the user terminal 100 may display the View Coupon interface 1230, the View Access Control Pass interface 1240, and the View Membership interface 1250 on the screen.

In one embodiment, the user terminal 100 may display the changed location range of 500 meters through the Location Range interface 1260, and when a user interaction for the Location Range Change interface 1270 is detected, the distance change interface 1120 may be displayed as shown in FIG. 11. When a user interaction for the Shaking Settings interface 1280 is detected, the shake setting user interface 810 shown in FIG. 8 may be provided.

It will be described based on comparison between FIG. 12 and FIG. 9. To this end, FIGS. 8 and 11 are referenced together. Referring to FIGS. 8 and 11, it can be seen that although the user has activated the membership view function 850 via the shake settings user interface, the H Department Store associated with the membership view function is located farther than 300 meters from the user's current location. Therefore, as shown in FIG. 9, if the location range is set to be within 300 meters, the membership view function may not be displayed through the shake function. However, as shown in FIG. 12, if the location range is set to within 500 meters, the membership view function 1250 may additionally be displayed through the shake function.

According to an embodiment of the present disclosure, it is possible to provide a user's desired service quickly and appropriately by providing the user's desired function in real time through a shaking movement of the user terminal without the user's additional input movement.

According to an embodiment of the present disclosure, by providing a user with a function determined based on location information of the user terminal and user information of the user terminal, it is possible to provide functions and services customized to the location and situation desired by the user.

The technical functions disclosed in each embodiment of the present disclosure are not limited to a corresponding embodiment, and unless incompatible with each other, the technical functions disclosed in each embodiment may be applied in combination to other embodiments.

Therefore, although each embodiment is described mainly about an individual technical function, the technical functions of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for providing a function based on a movement of a user terminal, the method comprising:

detecting a movement of the user terminal;

identifying current location information of the user terminal in response to the detected movement being a preset movement;

identifying a plurality of candidate functions available for performance by the user terminal, wherein the plurality of candidate functions are determined based on an association between the current location information and user information of the user terminal;

subsequent to identifying the plurality of candidate functions, selecting, from among the plurality of candidate functions, one or more functions that are preset via the user terminal to be activated in response to the preset movement, wherein the one or more functions are designated by a user through a movement-setting interface of the user terminal that allows the user to specify functions to be activated in response to the preset movement; and displaying a user interface corresponding to one of the one or more selected functions on the screen of the user terminal.

2. The method of claim 1, wherein identifying the plurality of candidate functions comprises determining, by the user terminal, whether the current location information confirmed by the user terminal is associated with user information stored in the user terminal.

3. The method of claim 1, wherein identifying the plurality of candidate functions comprises:

receiving data identifying candidate functions from a service server, wherein the service server determines whether the current location information is associated with user information of the user terminal; and based on the received data, identifying the plurality of candidate functions.

4. The method of claim 1, wherein selecting the one or more functions from among the plurality of candidate functions comprises:

applying user-designated movement-based activation settings to exclude candidate functions not designated via the movement-setting interface for activation in response to the preset movement.

5. The method of claim 1, wherein displaying the user interface comprises:

in response to a plurality of selected functions remaining after applying the movement-based activation settings, displaying a list of user interfaces corresponding to the plurality of selected functions on the screen of the user terminal.

6. The method of claim 5, further comprising:

detecting a user interaction with one of the user interfaces in the displayed list; and displaying, on the screen of the user terminal, the user interface corresponding to the selected function.

7. The method of claim 1, wherein the plurality of candidate functions are determined based on whether information of a place located within a preset distance from the current location information of the user terminal is associated with the user information of the user terminal.

8. The method of claim 7, further comprising:

detecting a user interaction for changing a range of the preset distance;

updating the plurality of candidate functions based on the changed range; and selecting one or more updated functions from the updated plurality of candidate functions in accordance with the movement-based activation settings.

9. The method of claim 1, wherein the user information of the user terminal comprises at least one of place reservation information of the user terminal, identity authentication information of the user terminal, coupon information, schedule information of the user terminal, membership information of the user terminal, or payment method information of the user terminal.

10. The method of claim 1, wherein the movement-setting interface presents a plurality of functions and allows the user to selectively enable or disable individual ones of the plurality of functions for activation in response to the preset movement.

11. The method of claim 1, wherein the functions designated through the movement-setting interface are stored as movement-based activation settings at the user terminal and are applied to filter the plurality of candidate functions identified based on the association between the current location information and the user information.

12. A user terminal for providing a function based on a movement thereof, the user terminal comprising:

a memory storing instructions, and a processor configured to execute the instructions to:

detect a movement of the user terminal;

identify current location information of the user terminal in response to the detected movement being a preset movement;

identify a plurality of candidate functions available for performance by the user terminal, wherein the plurality of candidate functions are determined based on an association between the current location information and user information of the user terminal;

subsequent to identifying the plurality of candidate functions, select, from among the plurality of candidate functions, one or more functions that are preset via the user terminal to be activated in response to the preset movement, wherein the one or more functions are designated by a user through a movement-setting interface of the user terminal that allows the user to specify functions to be activated in response to the preset movement; and display a user interface corresponding to one of the one or more selected functions on the screen of the user terminal.

13. A method for providing a function based on a movement of a user terminal by a server, the method comprising:

receiving current location information of the user terminal from the user terminal in response to a detected preset movement;

identifying a plurality of candidate functions based on whether the current location information is associated with user information of the user terminal;

receiving, from the user terminal, movement-based activation settings that specify one or more functions designated by a user to be activated in response to the preset movement;

selecting, from among the plurality of candidate functions, one or more functions based on the movement-based activation settings; and transmitting the selected one or more functions to the user terminal.

14. The method of claim 13, wherein identifying the plurality of candidate functions comprises determining whether the user information of the user terminal is associated with information of a place located within a preset distance from the current location information of the user terminal.

15. The method of claim 14, further comprising:

receiving a signal to change a range of the preset distance from the user terminal;

determining whether information of a place located within the changed range is associated with the user information of the user terminal;

updating the plurality of candidate functions based on the determination;

selecting one or more updated functions from the updated plurality of candidate functions in accordance with the movement-based activation settings; and transmitting the selected one or more updated functions to the user terminal.

16. The method of claim 13, wherein the user information of the user terminal comprises at least one of place reservation information, identity authentication information, coupon information, schedule information, membership information, or payment method information of the user terminal.

17. The method of claim 16, wherein the schedule information of the user terminal is received from the user terminal or an external server.

* * * * *